(12) United States Patent
King

(10) Patent No.: US 9,565,808 B2
(45) Date of Patent: Feb. 14, 2017

(54) PORTABLE PLANT SUPPORT SYSTEM

(71) Applicant: Pat King, Caldwell, ID (US)

(72) Inventor: Pat King, Caldwell, ID (US)

( * ) Notice: Subject to any disclaimer, the term of this patent is extended or adjusted under 35 U.S.C. 154(b) by 127 days.

(21) Appl. No.: 13/850,248

(22) Filed: Mar. 25, 2013

(65) Prior Publication Data

US 2013/0283684 A1 Oct. 31, 2013

Related U.S. Application Data

(60) Provisional application No. 61/614,989, filed on Mar. 23, 2012.

(51) Int. Cl.
*A01G 9/12* (2006.01)

(52) U.S. Cl.
CPC .................. *A01G 9/12* (2013.01); *A01G 9/124* (2013.01); *A01G 9/126* (2013.01)

(58) Field of Classification Search
CPC .......... A01G 9/022; A01G 9/025; A01G 9/12; A01G 9/122; A01G 9/124; A01G 9/126; A01G 17/00; A01G 17/04; A01G 17/06; A01G 17/14; A01G 9/02; A01G 9/16; A01G 31/02; A47G 7/02; A47G 7/041
USPC .................. 47/39, 44–47, 41.01, 31.1, 66.6, 70,47/41.04; 211/85.23, 181.1; 248/121
See application file for complete search history.

(56) References Cited

U.S. PATENT DOCUMENTS

| | | | | |
|---|---|---|---|---|
| 1,797,077 A * | 3/1931 | Dew | ...................... | A47G 7/041 211/85.23 |
| 3,360,885 A * | 1/1968 | St Clair | .................... | A01G 9/02 47/39 |
| 3,747,293 A * | 7/1973 | Van Slooten | ........... | B65B 25/02 100/3 |
| 3,935,671 A * | 2/1976 | Soot | ................................ | 47/70 |
| 4,254,579 A | 3/1981 | Flynn | | |
| 4,841,670 A * | 6/1989 | Bitter | ............................... | 47/47 |
| 4,860,489 A | 8/1989 | Bork | | |
| 5,778,597 A * | 7/1998 | Klevstad | .......................... | 47/47 |
| 5,848,522 A * | 12/1998 | Coviello, Jr. | .......... | A01D 46/26 47/32.4 |
| 6,050,529 A * | 4/2000 | Lin | ........................ | A47G 7/041 211/195 |
| 6,311,428 B1 * | 11/2001 | Marino et al. | .................... | 47/46 |
| 7,918,051 B2 | 4/2011 | Early | | |
| 2003/0221364 A1 * | 12/2003 | Mello | ............................ | 47/32.7 |
| 2005/0188610 A1 | 9/2005 | Shaver | | |
| 2006/0042159 A1 | 3/2006 | LaPelusa | | |
| 2007/0245624 A1 * | 10/2007 | Padden | ............................ | 47/39 |
| 2008/0190019 A1 | 8/2008 | Hart | | |
| 2009/0056217 A1 * | 3/2009 | Dipaolo et al. | .................... | 47/70 |

(Continued)

FOREIGN PATENT DOCUMENTS

FR 2815332 A1 * 4/2002 ............. A01G 9/126
JP 2013192535 A * 9/2013

*Primary Examiner* — Danielle Clerkley

(74) *Attorney, Agent, or Firm* — Scott D. Swanson; Shaver & Swanson, LLP

(57) ABSTRACT

What is disclosed is a portable and/or movable plant support system that can be used in a consumer setting in which a plant is grown with the movable support system and can be moved from one place to another without altering the plant's growth and in an embodiment of which an indeterminate plant can be grown and allowed to be lowered when lower portions of the plant stop producing, thus allowing for new growth and thus enhanced production at the top of the plant.

8 Claims, 11 Drawing Sheets

(56) References Cited

U.S. PATENT DOCUMENTS

2010/0229463 A1  9/2010  DeBruin

* cited by examiner

PORTABLE PLANT SUPPORT SYSTEM

This application claims the benefit of U.S. Provisional Application No. 61/614,989 filed Mar. 23, 2012, the disclosure of which is incorporated by reference.

TECHNICAL FIELD

The presently disclosed and claimed inventive concept(s) generally relates to an apparatus and a method for growing plants, and more particularly to an mobile plant support structure for improved portability of plants that are grown in a support device.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

One of the purposes of this invention is to attempt to bring the benefits of growing indeterminate tomatoes, which are used in commercial tomato growing, into the hands of consumer growers. This allows tomatoes to the consumer to grow indeterminate tomatoes properly and to get more production and a better, a healthier plant, and an overall improved growing experience. Traditionally tomato plants are grown in cages from the ground up. Similarly, methods exist for growing tomato plants upside down such as the Topsy Turvy® planters. Similar methods exist for growing both determinant and indeterminate tomatoes as well as other types of plants that grow with support systems, such as cucumbers, grapes, and flowering plants, for example.

Embodiments of the invention support both determinate and indeterminate vines. Indeterminate tomatoes are vines that can reach heights of 20 feet, while, indeterminate tomatoes are slow and steady producers of clusters of tomatoes and most varieties produce the larger, 1 to 2 pound tomatoes with very strong and thick vines. The best tomatoes are grown on the new upward growth off a single stem. Indeterminate vines can only support so many tomatoes at one time; otherwise they produce small, poor quality tomatoes. Determinate tomatoes on the other hand have a fixed height of 3 to 5 feet and produce a great many clusters at one time on multiple stems; making harvesting a batch for sauces and salsa possible. They will then push more blooms for another batch. Good weather, lighting, nutrients, pruning and temperature can stimulate new production.

Embodiments of the invention make it very simple for the gardener to grow one plant at a time indoors or out, year-round. There are multiple embodiments, one embodiment utilizes a five gallon bucket or similar container, great for moving indoors for the winter and also, to shadier areas of the garden in the growth stunting, blazing heat of July and August. Another embodiment is a frame that can be placed in the garden for growing season. The in ground stand is very stable and works well in various soil types. It is fantastic in raised beds where space is a premium.

A roller hook developed by the PasKal Company is used in commercial growth operations. The hooks are traditionally used on a wire hung at a distance (approximately 8 feet) above the plants and a hook holds a spool of twine that can be unraveled to the desired length. The string is strong enough to support a tomato plant or other plant. The string incorporates a clip to clip onto the string and on the tomato plant to keep the plant upright. The spool has a tensioned lever that has a stop on it to allow for the release of desired amounts of string. As the tomato plant grows, it grows up the twine toward the roller. When desired, the roller can be used to release lengths of twine and the plant is in effect layered on top of itself, thus allowing for more productive plant to continue growing toward the roller. It is generally thought that in tomato plants the last 6 feet of the tomato plant is most productive for producing tomatoes, although up to 8 feet of the plant is typically used in the commercial growth embodiments. The roller type parts are typically used in commercial systems, such as that in US patent publication number 2008/0190019. Similar methods and devices can also be used in place of the roller, depending on what exists in the market.

What is disclosed in this application is a device, system and method of growing plants, including indeterminate plants, on an individual, consumer level that allows for the plants and system to be easily transported. For example, the system allows for the device to be transported from outdoors to indoors in the fall in the event the weather becomes colder or less desirable for plant growth and/or fruit or vegetable production.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DESCRIPTION OF THE DEPICTED EMBODIMENTS

Figure 1:
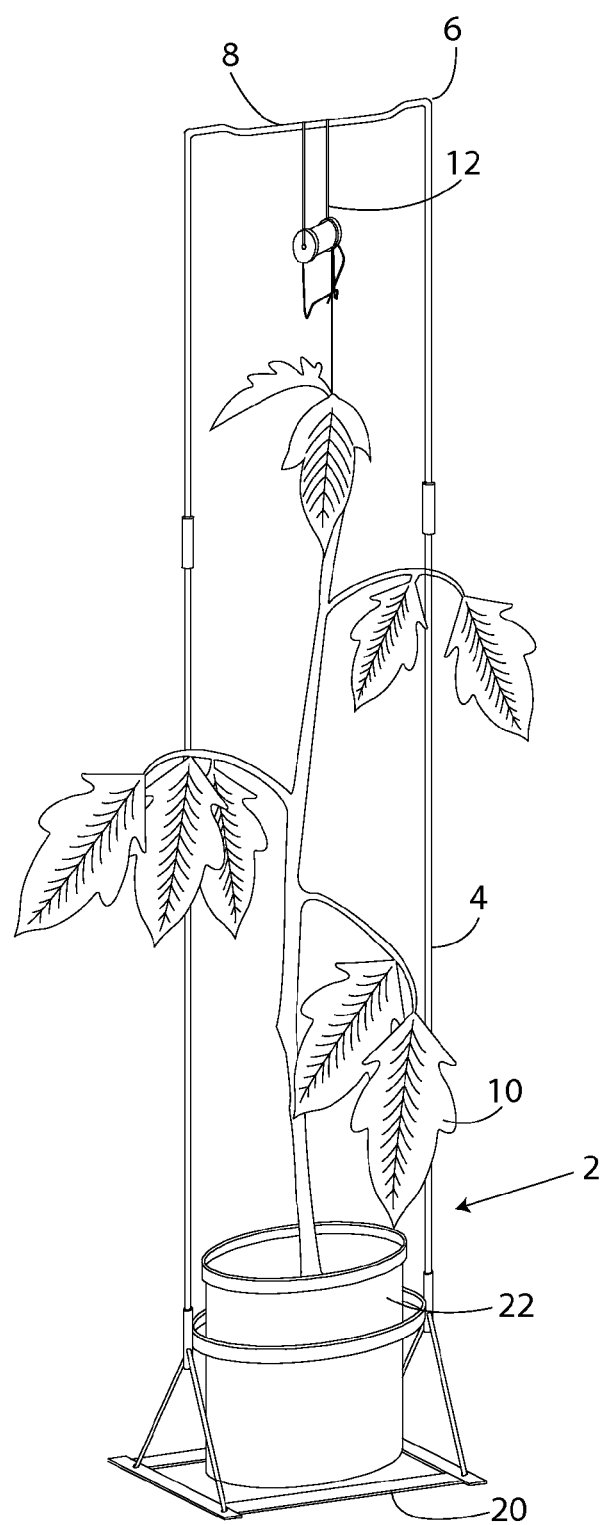
FIG. 1 illustrates a front perspective view of a preferred embodiment of the invention.

The device, as illustrated, provides a location on which to attach a roller and string (or roller and clip and string) such as that made by Pascal. The device provides for a location at which a plant pot can be placed within the device. It is currently thought that 5 gallon pots are most suitable for this use, although the holder area can be vary for different pot sizes. Further, the device could be made to include the pot built in to the system, although for interchangeability a ring type opening is used for placing the pot. The device has arm supports (extension arms) that are used to support cross member. The cross member can be designed with a hook used to support the roller and twine application. Similarly the device can be made with top member bent to support the roller device. The device also includes a base support that can be made is several embodiments. The base support can be made of flat pieces of metal with support system or can be made with supports that can be placed directly into the ground, such as shepherds hooks. The supports can be made with a wide variety of materials known in the industry, with the current preferred format being of a piece of metal tubing that is bent to make the two arm supports and the cross member. Similarly, a variety of materials can be used to make the ring support or the base support, with the current preferred method being to uses flat sheet metal to construct the ring as well as the feet supports that support the invention. Also a system of netting can be used to allow various types of plants to grow along the device. The specific dimensions of the metal are as follows:

In a preferred embodiment, Hot or Cold rolled steel rods in various sizes X 20 ft. long and 2 sizes of ¾" flat bar X 20 pt long, then cut and bent to be used in the system. This included 3/16" rod X 12 for the drop hook at top and 5/16"×3/8" rod for upright ¾×⅛ and 3/16" flat bar to feet base and ring and 4" of 3/16's rd for drop hook. 204" of 5/16 or ⅜'s rod for upright the 36"'s of rod was used to support and elevate the ring approx 8" from feet base. The ring was constructed using 38"s of ⅛ flat bar for the ring and 12" diameter. To bend the upper arms and cross bar the use of a hydraulic press and bender are used to get the correct bend in the rolled steel rods. In a preferred embodiment, the device is approximately 93 inches tall. The inventor has found that 5/16 rolled metal is the thinnest the inventor uses, smaller metal appears too flimsy. ⅜ inch rolled works well but is more expensive. Further a support may be needed between the upper arms. In sum, a huge variety of metal can be used (or other material) depending on, for example, the price, ability to weld the material, and ease of transport.

It is further thought that the device can be made in an expandable and/or extendable manner. The device could be modified such that a grow light attaches to the device. The device can also be made in a multitude of configurations such that the device is easily assembled and disassembled.

Regarding the method of the invention, it is thought best used by placing a tomato plant in a pot (or growing a tomato plant in the pot), placing the pot into the ring holder, lowering the string or twine from the device to the plant, and attaching the string to the plant via clamps. The plant can the grow up the string, or if there is no string and instead a net, up the net. As discussed above, the string can be lowered when the lower portion of the plant is not as productive as it once was, and the plant allowed to continue growing upward. The device can be used inside, before peak outdoor growing season, and subsequently transported outdoors for further growing and/or the plant can be moved indoors at some point to continue growing after the peak outdoor growing season. Similarly, a plant grown outdoors all of its life can be moved indoors and grown. It is thought that moving a plant using the current embodiments of the invention will allow for the plant to be moved without having to remove the plant from the support device and thus lowering the chance for harming the plant.

Figure 2:
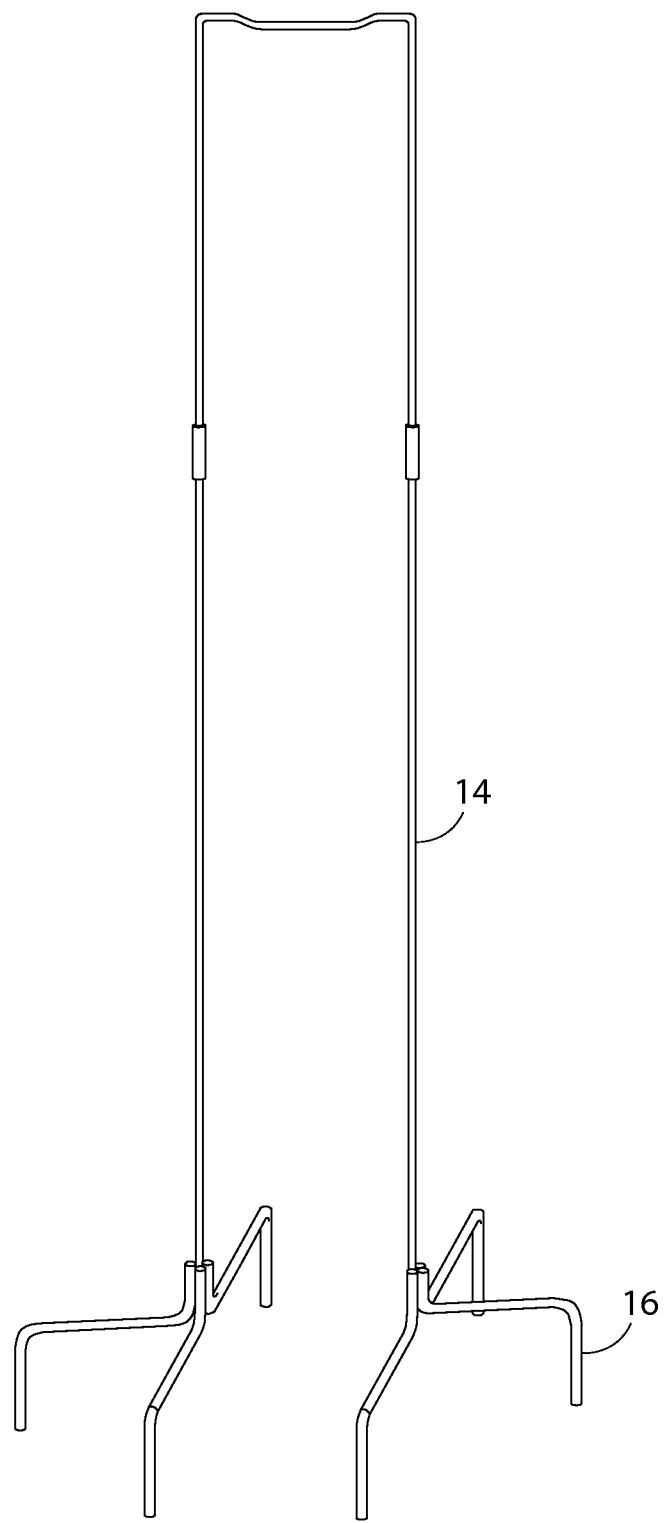
FIG. 2 illustrates a front perspective view of a preferred embodiment of the invention.
Figure 3:
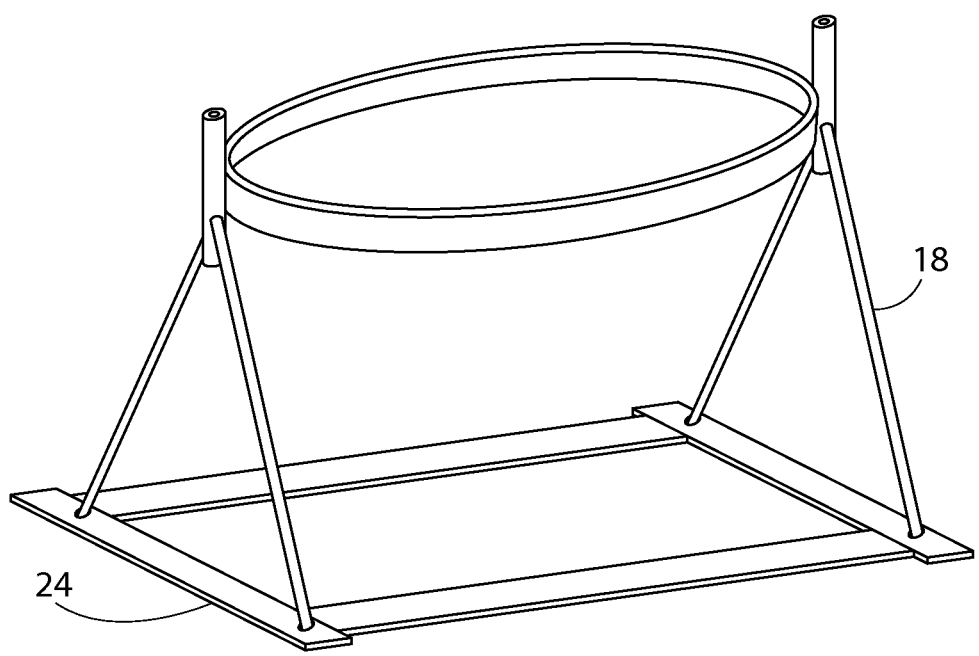
FIG. 3 illustrates a front perspective view of a preferred embodiment of the a base section of the invention.

FIGS. 1 and 2 illustrate a front view of a embodiments of the present invention. FIG. 1 illustrates a tomato plant 10 in an embodiment of the invention 2. The depicted embodiment of the invention has two vertical pieces 4 that provide support to the plant. The vertical pieces 4 extend upward to corner 6 at which point the rail travels generally horizontal with a bend 8 for the plant support device 12. The bend is appears as a depression in the cross member when the device is assembled in full. The depression projects downward toward the area for the plant to grow such that a roller or similar device can be placed in the depression. The depression is typically made using a metal bender. In this embodiment, the plant support device is a roller hook. The roller hook is used such as that the plant grows, in this illustration a tomato, grows up the string, as lower portions of the plant become unproductive, the plant can be subsequently lowered via roller 12 such that the vine is essentially folded as shown by the vine 19. The plant is in this case, bucket 20 that serves as the growth medium for the plant. FIG. 2 illustrates a similar embodiment of the invention, however not as portable. FIG. 3 illustrates the base of FIG. 1 without attachment to the vertical portions. An embodiment shown in FIG. 2 has a three prong base that is used for inserting into the ground. In this manner, the cage can be moved to different plants. The cage can be made to be in several parts 14, and the base section can be replaced or interchanged between FIGS. 1, 2, and 3.

Figure 4:
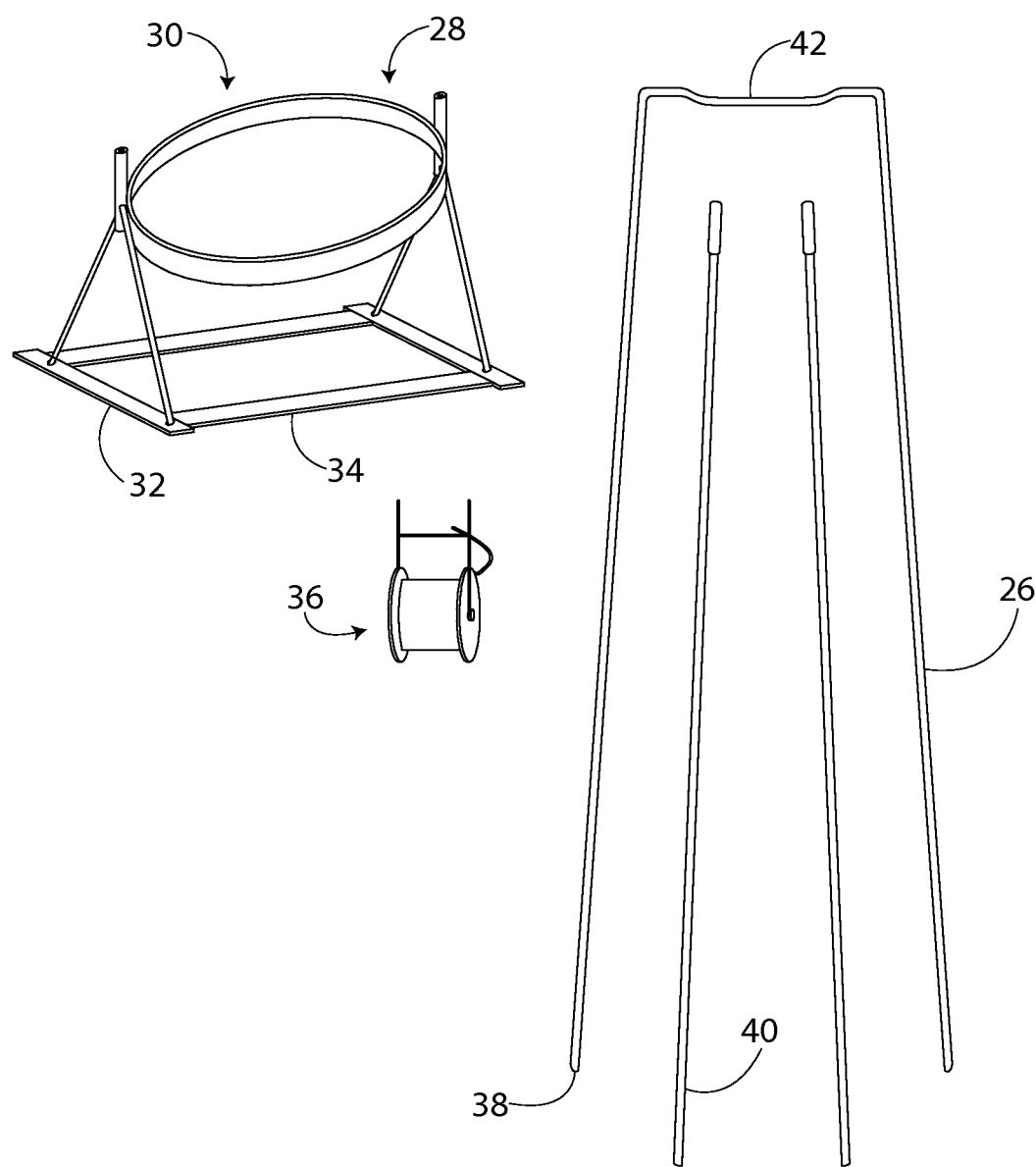
FIG. 4 illustrates a broken down version of an embodiment of the invention that is in a collapsible embodiment.

FIG. 3 illustrates the base supports 18 as well as lateral and vertical supports 24 that hold ring 25. Ring 25 is made such that a variety of different pots or buckets could be fit in there. This allows for the entire system to be moved, for example, inside or outside and can depend on the season. FIG. 4 illustrates the embodiment of the invention shown in FIG. 1 except for in a broken down state. FIG. 4 illustrates the portability and moveability or portability of the system.

FIG. 4 illustrates base 28 and support bar 26. Support bar 26 is in two pieces 40, 38 with piece 38 having an indentation 42 for the roller hook or similar hook. The base 30 has ring 30, lateral supports 34 and vertical supports 32. Roller hook 36 is illustrated unattached to the stand.

Figure 5:
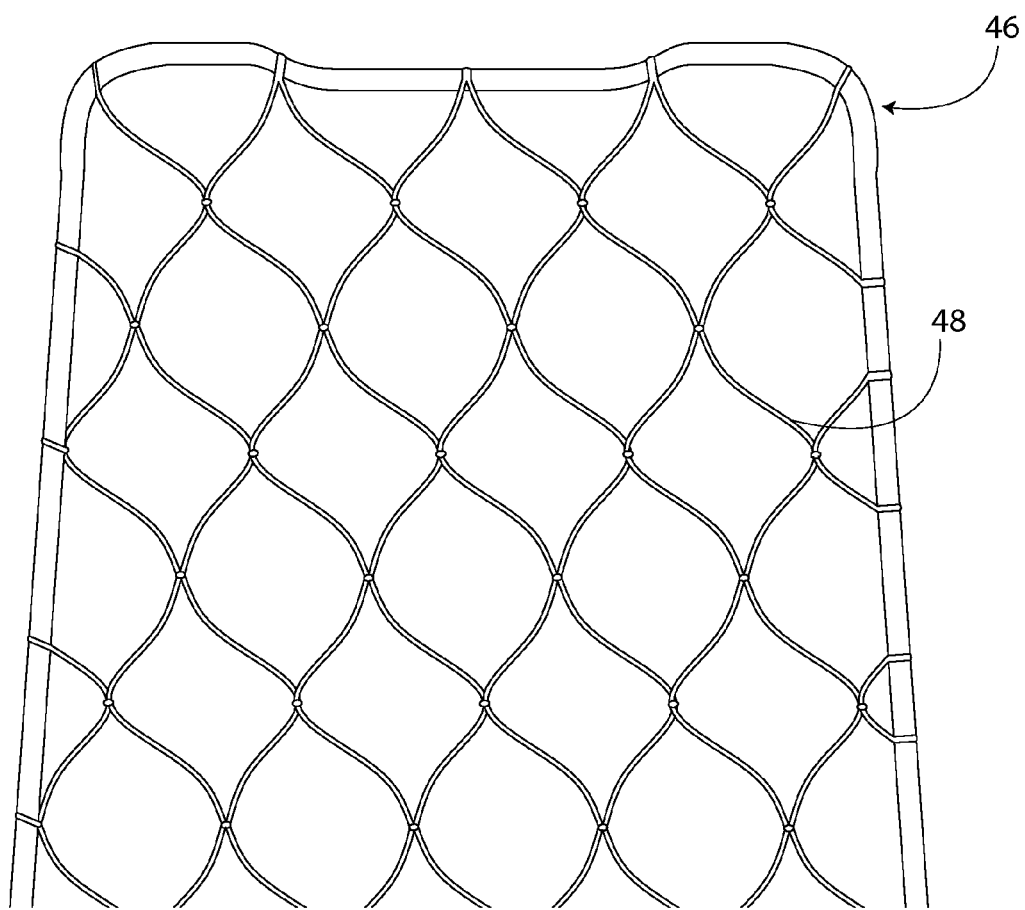
FIG. 5 illustrates an embodiment of the invention featuring netting for climbing plants.

FIG. 5 illustrates an embodiment of the invention with the netting 48 attached to stand 46. This allows for vine type plants to grow up the netting.

Figure 6:
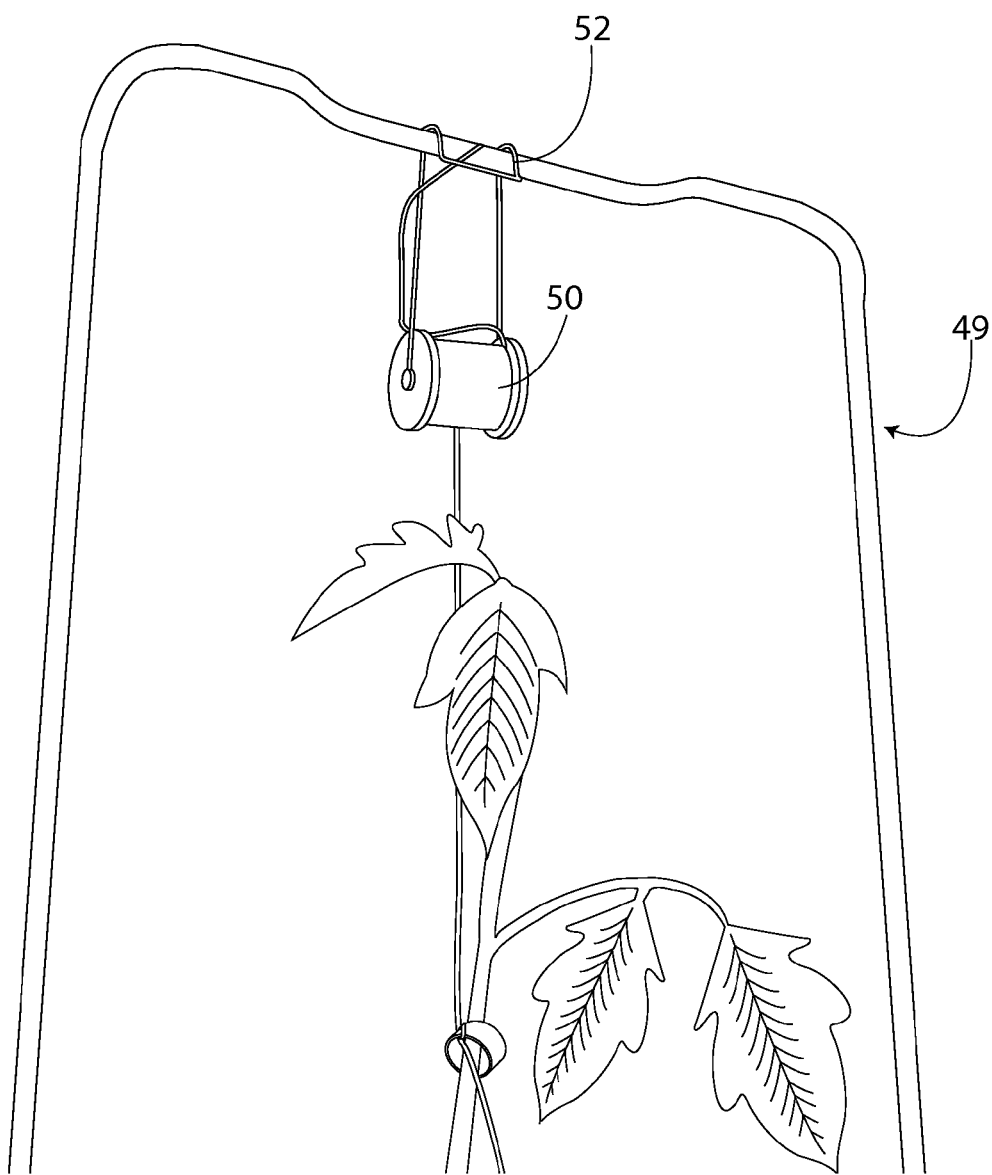
FIG. 6 illustrates a front view of an embodiment of the invention.

FIG. 6 illustrates an embodiment of the invention having roller hook 50 attached to stand 49 via connector 52. FIG. 6 illustrates a close up version of the roller hook that allows for the plant to be moved downward.

Figure 7:
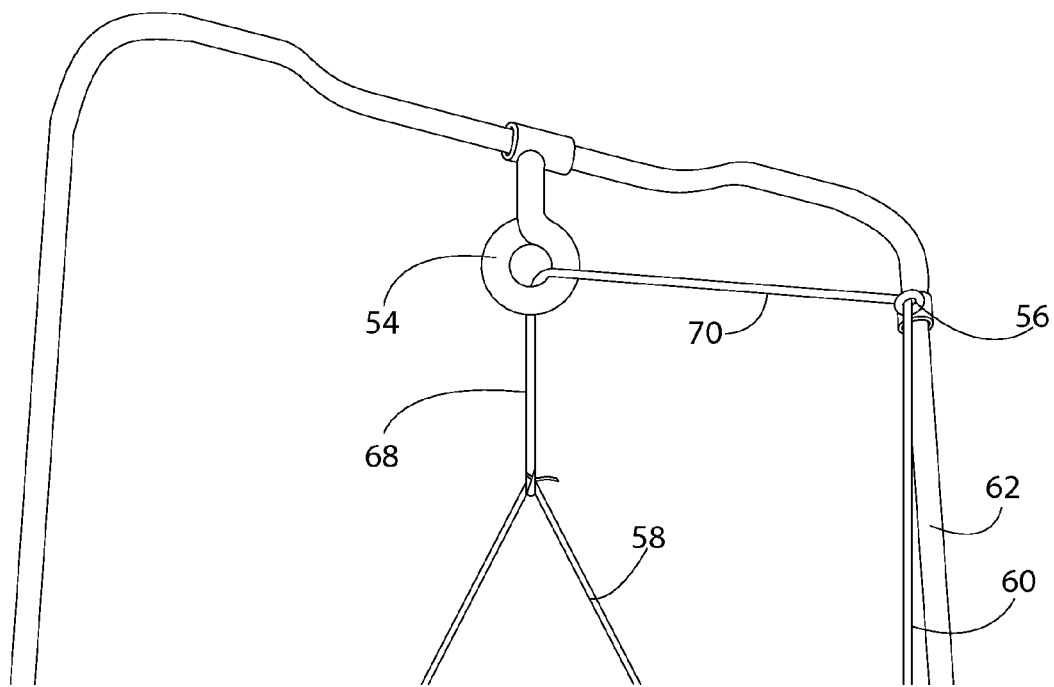
FIG. 7 illustrates a view of a plant support for an embodiment of the invention.
Figure 8:
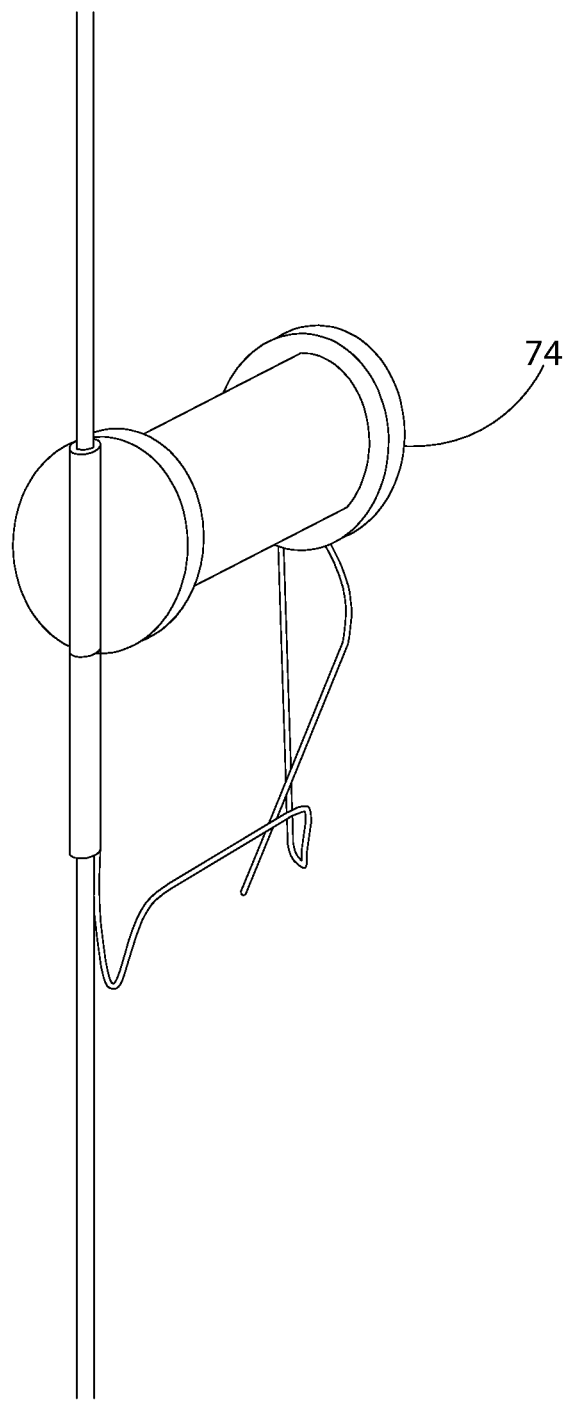
FIG. 8 illustrates a view of a plant support for an embodiment of the invention.

FIG. 7 illustrates a top portion of the invention with second portion shown in FIG. 8. In FIG. 8, roller hook 74 is positioned at a lower position on the vertical stand. The string is attached to the top via loops 56, 50 which could be a pulley system. This allows hook 56 to be hinged such as to place the roller in a different position. The string is attached to an object 58, in a preferred embodiment this would be a tomato plant.

Figure 9:
FIG. 9 illustrates a view of a plant support for an embodiment of the invention.
Figure 10:
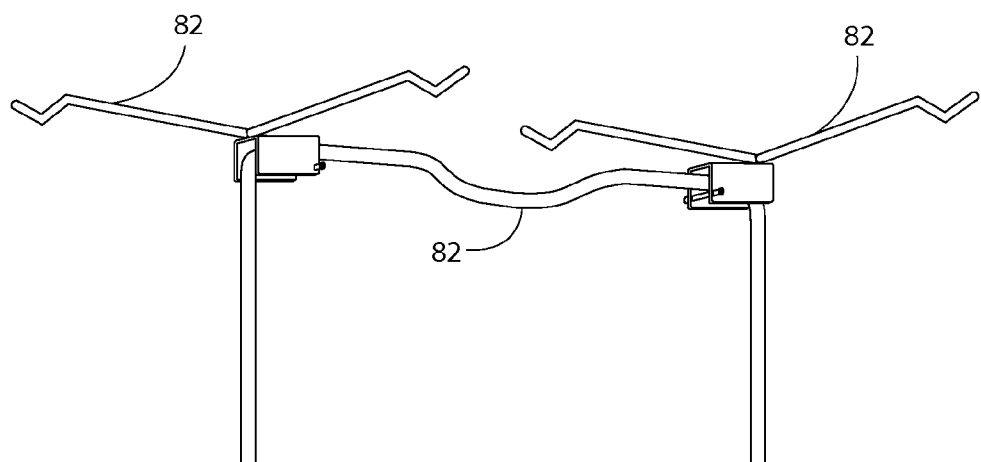
FIG. 10 illustrates a view of a plant support for an embodiment of the invention.

FIG. 9 illustrates a further embodiment of the invention. In this embodiment of the invention, the upper portion of the invention is said to have the interchangeability options of the device system. FIG. 10 illustrates a close up of the prongs of the depicted embodiment of the device in FIG. 9. These prongs allow for multiple strings or similar plant support devices to be attached. This is preferred, for example, in the growth of a determinate plant.

Figure 11:
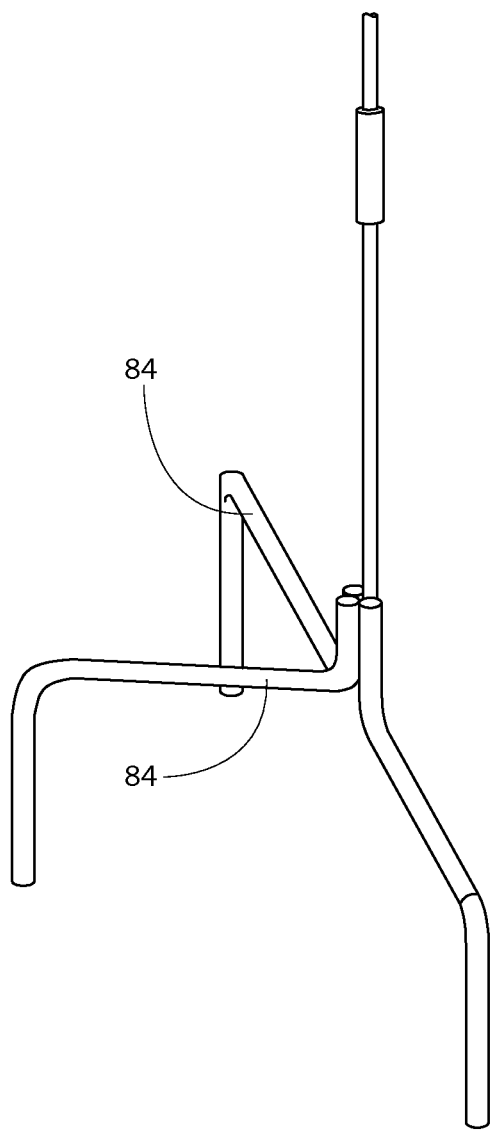
FIG. 11 illustrates a view of a base of the device for an embodiment of the invention.

FIG. 11 illustrates a close up of one embodiment of the alternate base section 84 of the invention. The alternate base section allows for the staking of the bases into the ground. This could also be used, for example, to set on concrete or on a different section, which for example, multiple plants are grown, single, or more preferably a determinate plant.

While certain exemplary embodiments are shown in the Figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

I claim:

1. A plant support device, wherein said plant support device consisting of a single inverted U-shape having two upright extension arms and a horizontally disposed extension arm cross member between said upright extension arms and connected to said extension arms; and
   a single string roller defined by a spool suspended by a hook from a generally medial position on said horizontally disposed extension arm cross member, wherein said string roller is configured to extend string generally downward from said cross member.

2. The plant support device of claim 1, wherein said plant support device comprises a pot support structure attached to said two upright extension arms proximate to a bottom of said inverted U-shape.

3. The plant support device of claim 1, wherein said plant support device comprises a pot positioned on said pot support structure.

4. The plant support device of claim 1, wherein said hook is integral with said horizontally disposed extension arm cross member.

5. The plant support device of claim 1, wherein said horizontally disposed extension arm cross member comprises a depression, wherein said depression is configured to retain said hook suspending said string roller.

6. The plant support device of claim 2 wherein said pot support structure comprises an open ended ring structure configured for a lip of a pot to rest on said ring structure to support said pot.

7. The plant support device of claim 1, wherein a bottom end of each of said upright extension arms is configured to be staked into the ground.

8. The plant support device of claim 1, wherein a bottom end of each of said upright extension arms comprises a base configured to be freestanding when placed on a floor.

* * * * *